June 10, 1930. C. L. DAVIS 1,763,224
FREQUENCY ADJUSTING MEANS FOR HIGH FREQUENCY SIGNALING SYSTEMS
Filed Oct. 29, 1929
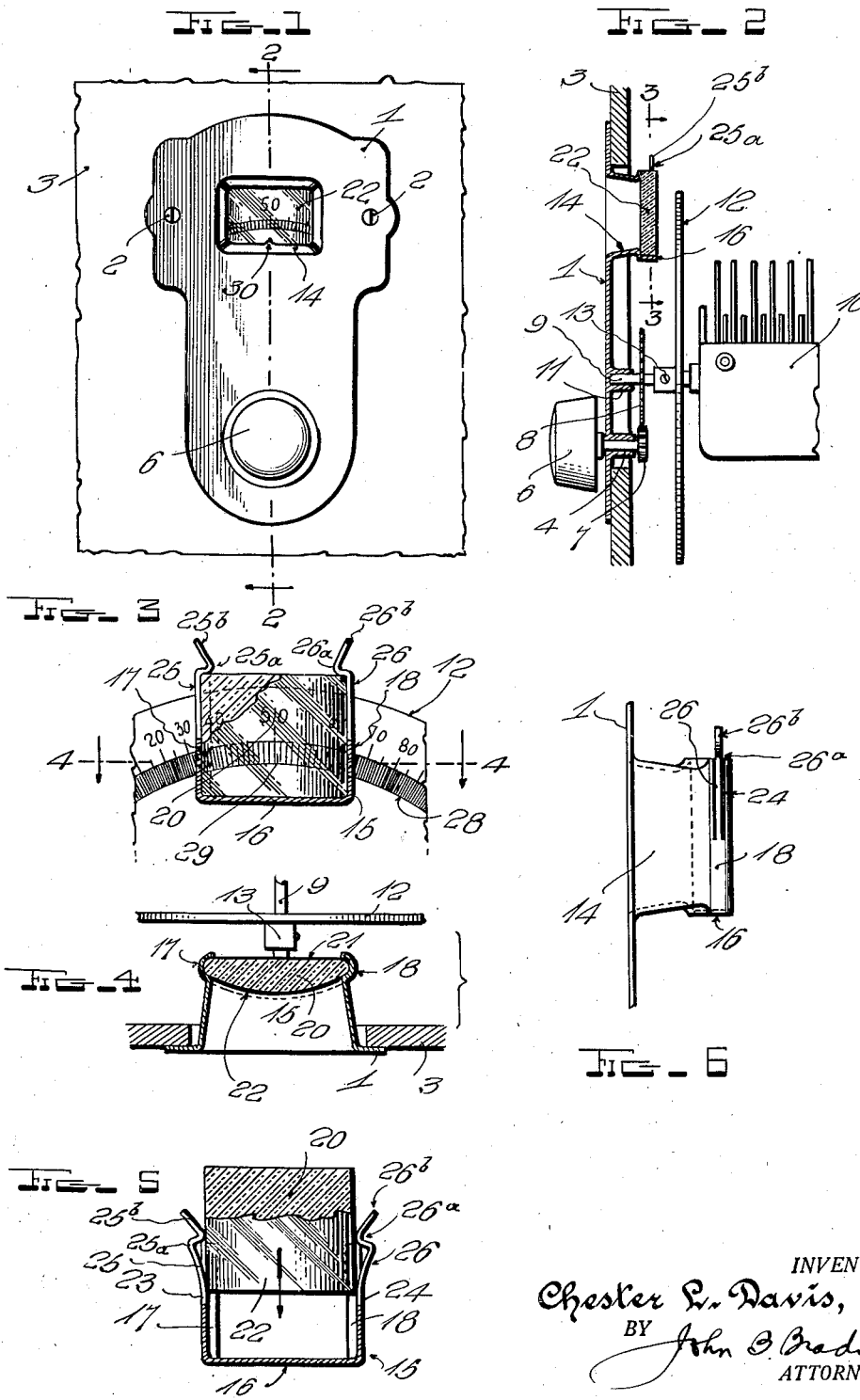
INVENTOR.
Chester L. Davis,
BY John B. Brady
ATTORNEY.

Patented June 10, 1930

1,763,224

UNITED STATES PATENT OFFICE

CHESTER L. DAVIS, OF KEOKUK, IOWA, ASSIGNOR TO WIRED RADIO, INC., OF NEW YORK, N. Y., A CORPORATION OF DELAWARE

FREQUENCY-ADJUSTING MEANS FOR HIGH-FREQUENCY SIGNALING SYSTEMS

Application filed October 29, 1929. Serial No. 403,317.

My invention relates to high frequency signaling systems in general and more specifically to apparatus employed in radio transmitters and receivers.

This application is a continuation in part of my application Serial No. 345,167 for "frequency adjusting means for high frequency signaling systems", filed March 7, 1929.

An object of my invention is to provide certain improvements in frequency calibration of radio receivers and transmitters.

Another object of my invention is to provide an improved frequency adjusting system for high frequency apparatus.

Still another object of my invention is to provide an improved frequency indicating system which is of compact form and applicable for installation on radio broadcast transmitters and receivers.

A further object of my invention is to provide a construction of magnifying indicator which may be readily applied to the panel of a cabinet of a radio broadcast receiver for indicating to the operator the various frequency settings to which a tuning instrument may be adjusted.

My invention can be better understood from the specification hereinafter following by reference to the accompanying drawings, wherein:

Figure 1 is a front elevation showing the indicator dial and magnifying means of my invention in position on the panel of a radio broadcast receiver; Fig. 2 is a cross-sectional view taken through the indicator and magnifying means on line 2—2 of Fig. 1; Fig. 3 is a fragmentary view of the magnifying portion of the indicator on line 3—3 of Fig. 2 with parts broken away and illustrated in cross-section; Fig. 4 is a cross-sectional view through the indicating portion of the indicator on line 4—4 of Fig. 3 and showing the fragmentary part of the indicating dial; Fig. 5 is a view of the carrier which supports the magnifying means in the indicator of my invention showing the lens about to be inserted in the carrier; and Fig. 6 is a fragmentary side elevation of the indicator with the magnifying means in position therein.

In high frequency signaling systems, both transmitters and receivers, some form of frequency adjusting means is employed. Associated with such means is provided a dial which is calibrated in frequency or merely in arbitrary numbers from which the frequency may be determined. It is difficult to provide an accurately calibrated disk or dial from which the frequency may be ascertained without designing a dial of large size. This dial then is subject to inaccuracies caused by temperature changes, mechanical imperfections, and inability of the operator to properly and accurately determine the calibration indicated at a particular adjustment. In my improvements in high frequency signaling systems, I provide certain features whereby the frequency adjustment of the high frequency apparatus may be accurately and readily determined and whereby the frequency is accurately and readily determined from the calibration without needless interpolation.

Referring to the drawings in detail, the indicator is illustrated as comprising a front plate member 1 which may be secured by suitable means such as screws 2 to the panel 3 of a radio broadcast receiver. The indicator 1 has a bushing 4 formed therein which provides a bearing for rotatable shaft member 5 under control of rotatable knob 6. The shaft 5 carries pinion 7 which meshes with gear 8 which is carried by shaft 9 of the tuning device such as a multiple gang condenser system 10. The shaft 9 extends into the bearing 11 which projects from the rear of the plate of indicator 1. The shaft 9 has dial 12 secured thereto as indicated at 13. The housing 14 projects inwardly to panel 3 into the receiving apparatus and terminates in a lens carrier designated generally at 15. The lens carrier 15 consists of a bottom ledge portion 16 and a pair of resilient arm portions 17 and 18. The arm portions 17 and 18 are shaped to embrace the sides of the lens 20. The lens 20 is ground to provide a plane surface 21 adjacent the dial 12 and a convex surface 22 adjacent the front panel of the receiving apparatus 3. That is to say, the lens is substantially plano convex. The side or arm portions 17 and 18 are each slotted as shown at 23 and 24 to provide resilient tongues 25 and 26, each of which have a locking lug portion 25ª and 26ª and a finger portion 25ᵇ and 26ᵇ. The lens 20 is mounted in the carrier 15 as shown more clearly in Fig. 5 by sliding the lens into place with the finger grips 25ᵇ and 26ᵇ spread apart to enable the lens to be moved into position. After the lens has been moved into position, the lugs 25ª and 26ª spring over the top edges of the lens 20 and maintain the lens in position. The lens may be removed for cleaning and polishing or for replacement in case of breakage but is rigidly held while in use. The dial 12 carries calibrations which I have represented at 28 which are very closely engraved as represented at 29 in such manner that the tuning device may be readily set to a selected position with reference to the mark 30 on indicator 1. A suitable hairline may be provided in lieu of the mark 30.

The advantages of the improvements in high frequency signaling systems of my invention are numerous. In the employment of extremely high frequency electrical energy, it is essential that the frequency adjusting means be accurately calibrated. The interpolation between two numbers or degrees of the calibration is difficult and accurate determination of the frequency adjustment from the calibrated indicating means is nearly impossible. This is due to the inaccuracy of calibration, mechanical features of construction or minuteness of the calibrated portion. Enlarging the calibrated drum or dial by enlarging its physical dimensions has previously been referred to and obviously is not a desirable feature. By employing an enlarging lens in the manner described, the actual physical enlargement of the calibrated portion with its accompanying disadvantages is avoided, while the dial or drum is optically enlarged to the observer. The calibration may be so small as not to be visible with the eye alone. The features of micromechanical adjusting means whereby effort is made to secure approximate indication is far inferior to the foregoing improvements of my invention. Physical expansion of the dial or drum due to an increase in temperature is greatly reduced by employing a small and accurately calibrated dial or drum.

Many modifications of my invention are possible, and it is to be understood that no restrictions upon my invention are intended other than those imposed by the appended claims.

What I claim as new and desire to secure by Letters Patent of the United States is as follows:

1. An indicator dial comprising a plate member adapted to be mounted adjacent the front panel of a radio broadcast receiver in front of the rotatable shaft of a tuning device, said indicator dial being carried by said rotatable shaft and movable behind said front panel, a housing projecting from said plate member, said housing having a pair of resilient arms on the extremity thereof, a lens insertable between said arms, and means connected to said arms for locking said lens in said housing for establishing a line of vision through said plate member for viewing said indicator dial in magnified proportions.

2. An indicator for radio apparatus comprising a plate member supportable on the front panel of a radio apparatus, a tuning device disposed behind said panel and having a rotary shaft journaled in said plate member, an indicator dial having calibrations formed adjacent the peripheral edge thereof, said dial being carried by said shaft, a housing projecting from said plate member, through the panel of the radio apparatus in alignment with the peripheral portion of said indicator dial, a lens carrier integrally formed on said housing, and a lens insertable in said lens carrier for providing a line of vision through said housing for observing the calibrations on said indicator dial in magnified proportions.

3. In an indicator apparatus, a rotatable shaft projecting normal to an instrument panel, a plate member secured to the instrument panel, a dial having calibrations formed adjacent the peripheral edge thereof and secured to said shaft for movement in a plane behind the instrument panel, said plate member having a portion thereof projecting through the instrument panel to a position adjacent said dial, a lens carrier formed thereon, a lens, and means on said lens carrier for removably supporting said lens in said lens carrier for providing a line of vision through said plate member for rendering the calibrations on said dial observable in magnified proportions.

4. In an indicator apparatus, a rotatable shaft projecting normal to an instrument panel, a plate member secured to the instrument panel, a dial having calibrations formed adjacent the peripheral edge thereof and secured to said shaft for movement in a plane behind the instrument panel, said plate member having a portion thereof projecting through the instrument panel to a position adjacent said dial, a lens carrier formed thereon, said carrier comprising a bottom edge, a pair of resilient side portions, a resilient arm in each of said side portions, a lens insertable into said lens carrier in abutment with said ledge in a position clamped between said resilient arms for providing a line of vision through said instrument panel for the observation of the calibrations on said dial in magnified proportions.

5. In an indicator apparatus, a rotatable shaft projecting normal to an instrument panel, a plate member secured to the instrument panel, a dial having calibrations formed adjacent the peripheral edge thereof and secured to said shaft for movement in a plane behind the instrument panel, said plate member having a portion thereof projecting through the instrument panel to a position adjacent said dial, a lens carrier formed thereon, said carrier comprising a bottom ledge, a pair of side portions extending therefrom, a resilient arm positioned in each of said side portions, each of said arms having a lug formed therein and having a finger piece on the extremity thereof, a lens insertable into said lens carrier for abutment with said ledge, said lugs operating to lock said lens in position for providing a line of vision through said instrument panel for the observation of the calibrations on said dial in magnified proportions.

6. Frequency adjusting apparatus for signal receiving systems comprising a movable indicator having calibrations thereon and controllable in position from the front of an instrument panel, a device positioned in front of said movable indicator and carried by the instrument panel and having a sighting aperture directed toward said movable indicator, a mounting frame formed integrally with said device and having resilient means carried thereby, a lens centered within said mounting frame and secured in position by said resilient means whereby the calibrations on said movable indicator may be viewed in magnified proportions for adjusting said movable indicator to selected frequency settings.

In testimony whereof I affix my signature.

CHESTER L. DAVIS.